(12) United States Patent
Abdulhayoglu (10) Patent No.: US 12,155,624 B2
(45) Date of Patent: *Nov. 26, 2024

(54) SYSTEM AND METHOD OF PROTECTING A NETWORK

(71) Applicant: Comodo Security Solutions, Inc., Bloomfield, NJ (US)

(72) Inventor: Melih Abdulhayoglu, Montclair, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/521,775

(22) Filed: Nov. 8, 2021

(65) Prior Publication Data
US 2022/0070143 A1     Mar. 3, 2022

Related U.S. Application Data

(63) Continuation of application No. 14/927,897, filed on Oct. 30, 2015, now Pat. No. 11,212,255.

(60) Provisional application No. 62/073,130, filed on Oct. 31, 2014.

(51) Int. Cl.
G06F 21/53     (2013.01)
G06F 21/56     (2013.01)
H04L 9/40      (2022.01)

(52) U.S. Cl.
CPC .......... H04L 63/0209 (2013.01); G06F 21/53 (2013.01); G06F 21/567 (2013.01); H04L 63/1425 (2013.01); H04L 63/164 (2013.01)

(58) Field of Classification Search
CPC ............. H04L 63/0209; H04L 63/1425; H04L 63/164; G06F 21/53; G06F 21/567

USPC ........................................................... 726/22
See application file for complete search history.

(56) References Cited

U.S. PATENT DOCUMENTS

| | | | | |
|---|---|---|---|---|
| 6,745,192 B1* | 6/2004 | Libenzi | ................ | H04L 63/145 |
| 7,832,010 B2* | 11/2010 | Higashikado | ......... | H04L 41/085 |
| | | | | 726/22 |
| 8,180,891 B1* | 5/2012 | Harrison | ............. | H04L 61/5007 |
| | | | | 709/224 |
| 8,307,434 B2* | 11/2012 | Sallam | .................. | G06F 21/566 |
| | | | | 726/22 |
| 8,539,072 B1* | 9/2013 | Harrison | ............ | G06Q 30/0269 |
| | | | | 709/224 |
| 8,769,063 B2* | 7/2014 | Barton | .................... | H04L 63/10 |
| | | | | 709/229 |
| 8,806,570 B2* | 8/2014 | Barton | .................. | H04W 12/08 |
| | | | | 726/1 |
| 8,869,235 B2* | 10/2014 | Qureshi | .................. | H04L 67/10 |
| | | | | 713/153 |
| 8,881,229 B2* | 11/2014 | Barton | .................. | H04W 12/30 |
| | | | | 726/1 |
| 9,043,480 B2* | 5/2015 | Barton | .................. | H04W 12/06 |
| | | | | 709/229 |
| 9,111,105 B2* | 8/2015 | Barton | .................... | H04L 51/08 |

(Continued)

*Primary Examiner* — Dant B Shaifer Harriman
(74) *Attorney, Agent, or Firm* — Joseph P. Aiena (57) ABSTRACT

There is provided a network appliance, methods and systems which intercept web and email traffic, extract executables, compare the executables with a policy and wrap the executables. Then, the wrapped executables are delivered to a client system in a manner to protect the network and end point devices, where the wrapped executables are run in a sandbox with all file system, registry accesses, communication and traffic isolated. Systems, networks, and methods for the prevention of phishing are also provided.

2 Claims, 9 Drawing Sheets

(56) References Cited

U.S. PATENT DOCUMENTS

| | | | | |
|---|---|---|---|---|
| 9,383,934 B1* | 7/2016 | Lukacs | .................. | G06F 3/0622 |
| 9,706,265 B2* | 7/2017 | Harrison | ............ | H04N 21/4126 |
| 9,977,903 B2* | 5/2018 | Hay | ..................... | G06F 21/606 |
| 9,986,279 B2* | 5/2018 | Harrison | ............ | H04N 21/4516 |
| 10,652,273 B2* | 5/2020 | Kraft | .................. | H04L 63/1416 |
| 10,878,110 B2* | 12/2020 | Kraft | .................... | H04L 9/3247 |
| 10,885,211 B2* | 1/2021 | Teal | ...................... | H04L 43/045 |
| 10,896,254 B2* | 1/2021 | McKerchar | ............ | G06F 21/51 |
| 10,997,303 B2* | 5/2021 | Kraft | .................... | H04L 63/0218 |
| 11,853,425 B2* | 12/2023 | McKerchar | ............ | G06F 21/56 |
| 2001/0010046 A1* | 7/2001 | Muyres | ............... | G07F 17/0014 |
| | | | | 705/52 |
| 2008/0109527 A1* | 5/2008 | Kunz | ..................... | H04L 67/34 |
| | | | | 709/217 |
| 2011/0145926 A1* | 6/2011 | Dalcher | ................ | G06F 21/552 |
| | | | | 726/26 |
| 2011/0167493 A1* | 7/2011 | Song | .................. | H04L 63/1466 |
| | | | | 726/23 |
| 2011/0296246 A1* | 12/2011 | Cooper | ................ | G06F 11/362 |
| | | | | 714/E11.217 |
| 2013/0198841 A1* | 8/2013 | Poulson | ................ | G06F 21/51 |
| | | | | 726/23 |
| 2013/0291086 A1* | 10/2013 | Pontillo | .............. | H04L 63/0823 |
| | | | | 726/10 |
| 2013/0305368 A1* | 11/2013 | Ford | ..................... | G06F 21/566 |
| | | | | 726/23 |
| 2014/0032691 A1* | 1/2014 | Barton | .................. | H04W 12/08 |
| | | | | 709/206 |
| 2014/0032733 A1* | 1/2014 | Barton | ................ | G06F 21/6218 |
| | | | | 709/223 |
| 2014/0032758 A1* | 1/2014 | Barton | .................... | H04L 41/00 |
| | | | | 709/225 |
| 2014/0040638 A1* | 2/2014 | Barton | .................... | H04L 41/00 |
| | | | | 713/193 |
| 2014/0040977 A1* | 2/2014 | Barton | .................... | H04W 12/37 |
| | | | | 726/1 |
| 2014/0040978 A1* | 2/2014 | Barton | .................. | H04W 12/08 |
| | | | | 726/1 |
| 2014/0040979 A1* | 2/2014 | Barton | .................. | H04W 12/30 |
| | | | | 726/1 |
| 2014/0053234 A1* | 2/2014 | Barton | .................. | H04W 12/06 |
| | | | | 726/1 |
| 2014/0337528 A1* | 11/2014 | Barton | .................... | H04L 41/00 |
| | | | | 709/225 |
| 2016/0227265 A1* | 8/2016 | Harrison | ................ | H04L 63/10 |
| 2017/0054760 A1* | 2/2017 | Barton | ................ | H04L 63/0823 |
| 2017/0109529 A1* | 4/2017 | Kraft | ..................... | G06F 21/563 |
| 2017/0118233 A1* | 4/2017 | Abdulhayoglu | ........ | G06F 21/53 |
| 2017/0302653 A1* | 10/2017 | Ortner | ................. | H04L 63/0435 |
| 2018/0253550 A1* | 9/2018 | Kuperman | ............. | G06F 15/76 |
| 2019/0124102 A1* | 4/2019 | Abdulhayoglu | ........ | G06F 21/53 |
| 2019/0213325 A1* | 7/2019 | McKerchar | ............ | G06F 21/51 |
| 2022/0360594 A1* | 11/2022 | Cosgrove | ............. | H04L 9/3247 |

* cited by examiner

SYSTEM AND METHOD OF PROTECTING A NETWORK

CROSS REFERENCE TO RELATED APPLICATIONS

This Application claims priority from Provisional Application No. 62/073,130 filed on Oct. 31, 2014, and U.S. patent application Ser. No. 14/927,897 filed on Oct. 30, 2015, each of which is incorporated herein by reference in its entirety.

BACKGROUND

Traditional signature-based security solutions cannot defend against Zero-day and Advanced Persistent Threat (APT) attacks effectively. As a result, some vendors are now providing an appliance based solution. These solutions run threats in a virtual machine in an appliance, then the solution analyzes the threats in signature-less, behavior based way. There are, however, numerous drawbacks of a virtual machine based appliance. First, all threats are executed and analyzed in the appliance, which makes the appliance the performance bottle neck. Second, virtual machine based analysis can be bypassed easily by virtual machine detection and malware may behave differently when running in a virtual machine versus a physical machine. Third, users have to wait until analysis completes before they can actually use these executable files on their client systems. Fourth, some threats may infect a system with a delay of time, even after several hours—a virtual machine based appliance cannot detect the threats in this case. Additionally, when an analyzer fails to detect a threat, the threat will compromise the client system directly.

There is a need therefore, to overcome these and other drawbacks so that threats may be eliminated and executable files delivered in an effective manner which protects networks and end points thereof.

SUMMARY OF THE INVENTION

The present invention describes a system and method to deliver executables to network endpoints in a secure manner from an appliance so as to protect the network from potentially malicious executable files. The appliance of the present invention acts as a gateway where it can sniff all the network traffic, analyze the traffic and prevent external threats which could infect local systems. All executable applications, both known and unknown, are wrapped in a protective manner before delivery to a client system or end point. With the present invention, threats are run in a sandbox environment in client systems and behavior analysis is performed while the threats are running.

The present invention is a system for protecting a network from executables which comprises a network appliance having an interceptor that receives network traffic from a network and analyzes the network traffic for any and all executable application(s). The system has a packer which produces a wrapped executable application by wrapping the executable application and a data transmission connection to deliver the wrapped executable application to a client system. The client system includes at least one computer or handheld device connected to the network with the wrapped executable application running in a sandbox on the client system. The system for protecting a network further includes an embodiment where at least one predefined policy or rule or rule set is applied to the network traffic to separate an unknown executable application, with the packer then wrapping only the unknown executable application to produce the wrapped executable application. The system of the present invention provides for behavior analysis to be performed on the wrapped executable application in said sandbox. In this way, any suspicious behaviour can be determined and the network, along with the end points, is made more secure and protected.

With the system of the present invention, the wrapping of the executable application(s) includes a sandbox and the executable application(s) is placed inside the sandbox to produce the wrapped executable application. The wrapping can also include providing at least one executable script with the executable application and delivering the at least one executable script with the executable application as the wrapped executable application. The system of the present invention then runs the at least one executable script on the at least one computer or handheld device of an end user.

In an embodiment of the system of the present invention wrapping the executable application includes determining if a sandbox exists on the computer or handheld device of an end user and then extracting the executable application from the wrapped application if a sandbox exists. In this case, the system sends only the executable application to the sandbox on the at least one computer or handheld device of the end user.

The present invention includes a network appliance which comprises an interceptor for receiving network traffic and analyzes the network traffic for executable applications or at least one executable application at a time. The network appliance also has a packer which produces a wrapped executable application by wrapping the executable applications or at least one executable application, and a data transmission connection to deliver the wrapped executable application to a network client system or an end point. The network appliance further includes at least one predefined policy or rule or rule set applied to the executable applications or at least one executable application to separate an unknown executable application. The packer then wraps only the unknown executable application to produce the wrapped executable application which is delivered to the client system or end point.

In the network appliance of the present invention, the wrapping includes a sandbox and at least one executable application is placed inside the sandbox to produce the wrapped executable application. In the network appliance of the present invention, in an embodiment, the wrapping includes providing at least one executable script with the at least one executable application and delivering the at least one executable script with the at least one executable application as the wrapped executable application. The at least one executable script is run on a computer or handheld device of an end user.

Further, the network appliance of the present invention includes an embodiment wherein wrapping the at least one executable application includes determining if a sandbox exists on a computer or handheld device of an end user and extracting the at least one executable application from the wrapped application if a sandbox exists. In this embodiment, the network appliance sends only the at least one executable application to the sandbox on the computer or handheld device of the end user.

The present invention includes a method to protect end points of a network which comprises monitoring network traffic of a network and extracting at least one executable application from the network traffic. The method then wraps the at least one executable application and sends the wrapped executable application to an end user of the network. The method further includes identifying an unknown executable application based on at least one rule or policy after extracting at least one executable application from the network traffic. The method then wraps the unknown executable application and sends the wrapped unknown executable application to an end user of the network.

In the method of the present invention, the wrapping step includes placing the at least one executable application inside a sandbox and delivering the at least one executable application and the sandbox to the end user. In an embodiment, the wrapping step comprises including at least one executable script with the at least one executable application and delivering the at least one executable script with the at least one executable application to the end user. Then, running the at least one executable script on a computer or handheld device of the end user.

The present invention also includes a method to protect a network. This comprises monitoring the network traffic of a network and wrapping at least one executable application found within and on the network traffic. The method of protecting a network then determines if a sandbox exists on a computer or handheld device of an end user and, if a sandbox exists, then extracting the at least one executable application from the wrapped application and sending only the at least one executable application to the sandbox on the computer or handheld device of the end user.

The method further includes an embodiment of identifying an unknown executable application based on at least one policy after monitoring network traffic and wrapping the unknown executable application. The method again determines if a sandbox exists on the end point, and if so, the unknown executable application is extracted from the wrapped unknown executable application. In this embodiment, the method sends only the unknown executable application to the sandbox on the computer or handheld device of the end user via data transmission connection.

The present invention also includes a method to protect an end user of a network where an agent or piece of malware already exists on the end user's device and is waiting to be activated by a second file or code(s). The method comprises monitoring network traffic of the network and sending an alert to the end user to run an executable application in a sandbox. Then, the method sends the executable application to a computer or handheld device of an end user and prevents the executable application from communicating instructions with an agent which exists on the computer or handheld device of the end user.

The method further includes identifying an unknown executable application based on at least one rule or policy after the step of monitoring network traffic and sending an alert to the end user to run the unknown executable application in a sandbox. Then the unknown executable application is sent to a computer or handheld device of an end user, which can be run in a sandbox. Thereby, the method prevents the unknown executable application from communicating instructions with an agent which exists on the computer or handheld device of the end user.

The method to securely deliver executables to an endpoint includes monitoring network traffic, extracting executable applications from the network traffic, identifying an unknown executable application based on a set of rules or policies, wrapping the unknown executable application and sending the wrapped unknown executable application to an end user operating a computer or handheld device as the endpoint. By wrapping the unknown application prior to delivery to a client system and hence end points, the unknown application is securely delivered to an end point without infecting the local system.

In the method of the invention, the wrapping step includes placing the unknown executable application inside a sandbox and delivering the unknown executable application and the sandbox to the end user.

In an embodiment of the invention, the wrapping step comprises the inclusion of at least one or more executable scripts with the unknown executable application and delivering the at least one or more executable scripts with the unknown executable application to the end user. The at least one or more executable scripts are then run on a computer or handheld device of the end user.

The present invention provides a method to securely deliver executables to an endpoint which includes monitoring network traffic, identifying an unknown executable application based on a set of rules or policies, wrapping the unknown executable application. In this embodiment, the invention determines if a sandbox exists on a computer or handheld device of an end user and then extracts the unknown executable application from the wrapped application if a sandbox exists. The method then sends only the unknown executable application to the sandbox on the computer or handheld device of the end user. In this manner, the size of the files which are transmitted to the endpoint are reduced significantly.

The present invention also includes end point security where an existing suspicious, malicious or information tracking agent is already on the end point and is awaiting instructions or activation by a second portion of code. The present invention can overcome this cybersecurity issue by a method to securely deliver executables to an end user by monitoring network traffic and identifying an unknown executable application based on a rule set or policies. The invention sends an alert or message to the end user to run the unknown executable application in a sandbox. The invention sends the unknown executable application to a computer or handheld device of an end user. Once at the end point, the invention prevents the unknown executable application from communicating instructions with an existing agent on the computer or handheld device of the end user which is a malicious, suspicious, or information tracking agent. This could include various viruses, malware, widgets, beacons, trackers, botnets, malvertising networks (malicious advertising networks), codes, scripts, multimedia content files or any other file or code which could be activated by or receive instructions from a second file or code. The present invention includes a network appliance. The appliance has an interceptor which receives network traffic, such as internet, http/https downloads, email traffic and attachments, instant message transferring messages. The interceptor analyzes the network traffic for executable applications and a set of predefined rules or policies are applied to the executable applications to separate any and all unknown executable application(s). The network appliance includes a packer, which produces a wrapped executable application by wrapping the unknown executable application and a data transmission connection to deliver the wrapped executable application to an endpoint on a client in a secure manner.

In the network appliance of the present invention, the wrapping includes a sandbox and the unknown executable application is placed inside the sandbox to produce the wrapped executable application.

In an embodiment of the network appliance of the present invention, the wrapping includes providing at least one or more executable scripts with the unknown executable application. The at least one or more executable scripts are delivered with the unknown executable application as the wrapped executable application. The at least one or more executable scripts are then run on a computer or handheld device of an end user.

The network appliance of the present invention also has an embodiment where wrapping the unknown executable application includes determining if a sandbox exists on a computer or handheld device of an end user. If a sandbox already exists, the unknown executable application is extracted from the wrapped application, and then the present invention sends only the unknown executable application to the sandbox on the computer or handheld device of the end user.

The present invention also includes a system for securely delivering executables to an endpoint. The system comprises a network appliance and a client system. The network appliance has an interceptor which receives network traffic from a network and analyzes the network traffic for executable applications. The system applies a set of predefined policies or rules applied to the executable applications to separate each unknown executable application. A packer then produces a wrapped executable application by wrapping the unknown executable application. The network appliance of the system of the present invention has a connection for data transmission to deliver the wrapped executable application to a client system. The client system includes a computer network and comprises at least one computer or handheld device connected to the network, normally receiving internet, web traffic, and email traffic. The wrapped executable application is run in a sandbox on the client system. The system of the present invention includes behavior analysis performed on the wrapped executable application in the sandbox.

In the system of the present invention, the wrapping of the unknown executable application includes a sandbox and the unknown executable application is placed inside the sandbox to produce the wrapped executable application.

The system of the present invention also provides for the wrapping of the unknown executable applications to include providing at least one or more executable scripts with the unknown executable application. The one or multiple executable scripts are delivered with the unknown executable application as the wrapped executable application. The at least one or more executable scripts are then run on the at least one computer or handheld device of the end user.

The system of the present invention includes an embodiment where wrapping the unknown executable application is accomplished by first determining if a sandbox exists on a computer or handheld device of an end user. If a sandbox exists, the unknown executable application is extracted from the wrapped application and only the unknown executable application is sent to the sandbox on the at least one computer or handheld device of the end user.

The present invention includes embodiments which are used to prevent phishing and similar phishing type attacks for each of the methods, systems, and network appliances described herein. In these embodiments, the network traffic includes email or text messages in particular. The executable application described above and herein for the systems, methods and network appliances is from an email or message with an executable application, such as an attachment or a link to redirect the individual clicking the link. In the phishing attack, the email or message claims the executable application with the email or message is not an executable application or is hiding that fact from the recipient, thereby enticing the recipient to click the link or the executable file. The email in phishing attacks often originates from a sender which has not previously communicated with the recipient of the email, even though it may be disguised as something familiar to the recipient (such as popular brands or services, or websites, even email/messages from family or friends). In these embodiments, the executable application is wrapped as noted above and described further herein or alternatively, the executable application is prevented from communicating instructions to the computer or handheld device of the user. The present invention and method has several advantages and features. The present invention is an effective protection against zero-day attacks and advanced persistent threats. With the present invention, the analysis is performed in the client systems, which reduces the workload of the appliance. Additionally, unlike a virtual machine solution, it cannot be bypassed by virtual machine detection. By executing threats in the client system, the present invention can retrieve the threat's precise and actual behavior(s). Further, by analyzing threats while using them, the invention provides a seamless user experience. Another feature of the present invention is that even if the analyzer of the present invention fails to detect threats, no intrusion happens in client systems because the threats are running in a sandbox environment.

DETAILED DESCRIPTION

When a user browses the internet or opens emails and attachments with their computer or handheld device, the users are also opening themselves and their computers, devices, and systems to numerous cybersecurity risks, such as malware, viruses, and phishing attacks to identify only a few. The present invention enhances the user's cybersecurity and overcomes the disadvantages of prior solutions mentioned previously. In the present invention, there is provided a network appliance for intercepting web and email traffic and downloads, then extracting executables, comparing them with a policy and wrapping it. Then, the wrapped executables are delivered to a client system where they run in a sandbox with all file system, registry accesses, communication and traffic isolated.

Figure 1:
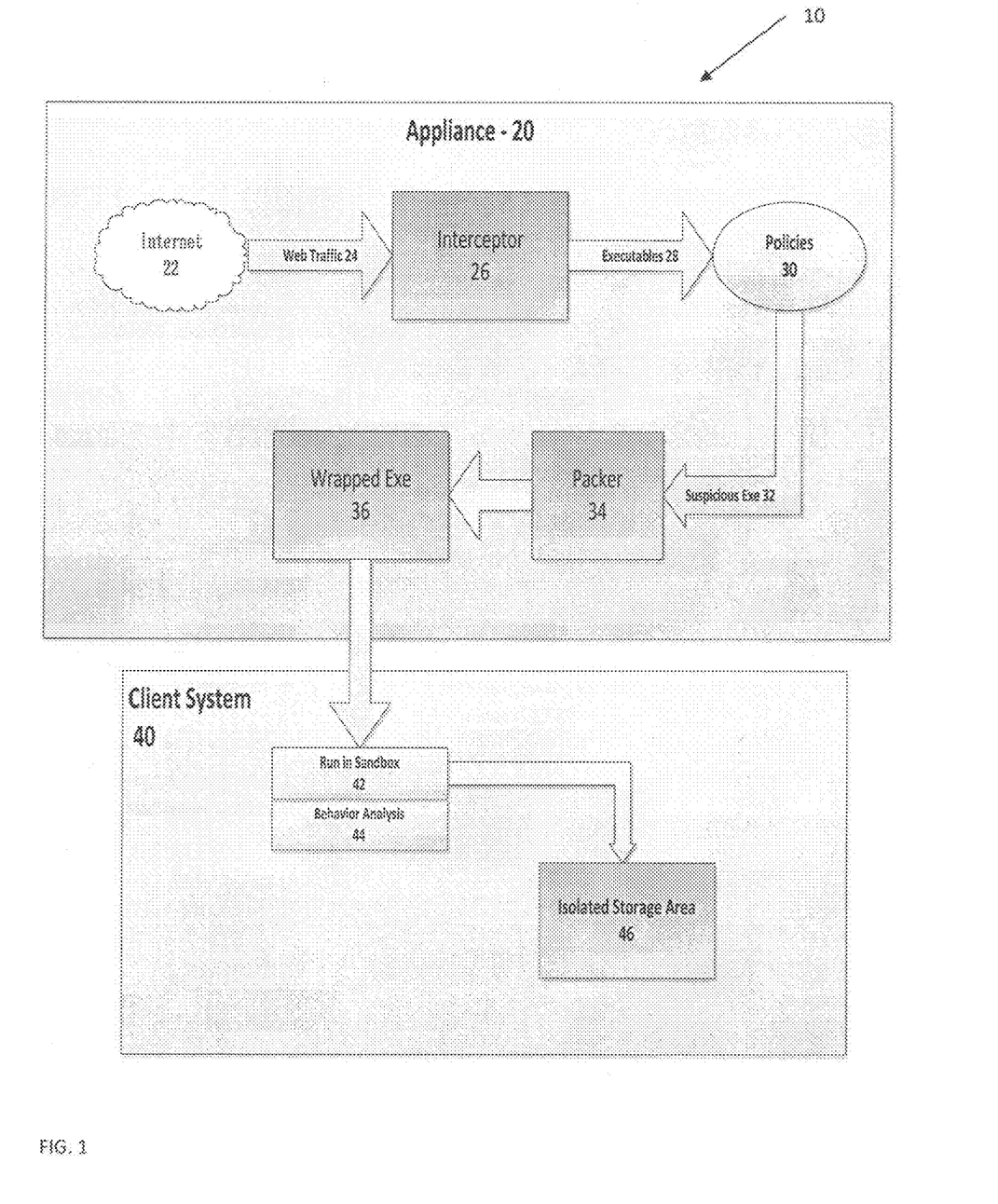
FIG. 1 is a schematic of the method and appliance of the present invention.

Referring to FIG. 1, the system and process of the present invention 10 is shown. The system and process includes an appliance 20 in communication with a client system 40. Within the appliance process, internet 22 and web traffic 24 are intercepted by interceptor function 26 which extracts the executable files 28 from the traffic 24. The executable files 28 are compared with policies 30 to identify suspicious executable files(s) 32. These suspicious executable file(s) 32 are sent to a packer tool 34 which wraps the suspicious executable 32 to create a wrapped executable 36 which can be delivered to the client system 40. The wrapped executable 36 is run inside a sandbox 42 at the client system 40. At this time, behavior analysis 44 of the wrapped files 36 is also performed. This is stored at isolated storage area 46, separate from communication and email or internet traffic on the client system 40.

In an embodiment, particular for use in preventing phishing attacks (ie., anti-phishing), the executable application is from or part of an email or message with an executable application, link, or attachment which the email/message claims is not an executable application in an attempt to deceive the recipient. Alternatively, the email or message may deceive the recipient about the function of the executable application. The email or message originates from a sender which had not previously communicated with the recipient of the email or sent any other emails or messages to this recipient. The executable application is identified as a potential phishing attempt and may be wrapped or prevented from communicating instructions to other agents on the handheld device or computer. Again, the executable file may be isolated and stored separately from network traffic for further analysis, or deleted, as the system administrator determines.

Interceptor:

By monitoring web access and traffic, the appliance 20 of the present invention 10 extracts executable files from an HTTP/HTTPS download request, email traffic and IM transferring messages. At least one or various policies or rule sets (e.g. digital signatures, file sources, file attributes, etc.) are used to determine whether they should be wrapped. All potential suspicious executables are sent to the packer tool for sandbox wrapping. Additionally, all of the executables can be sent to the packing tool for wrapping.

Figure 2:
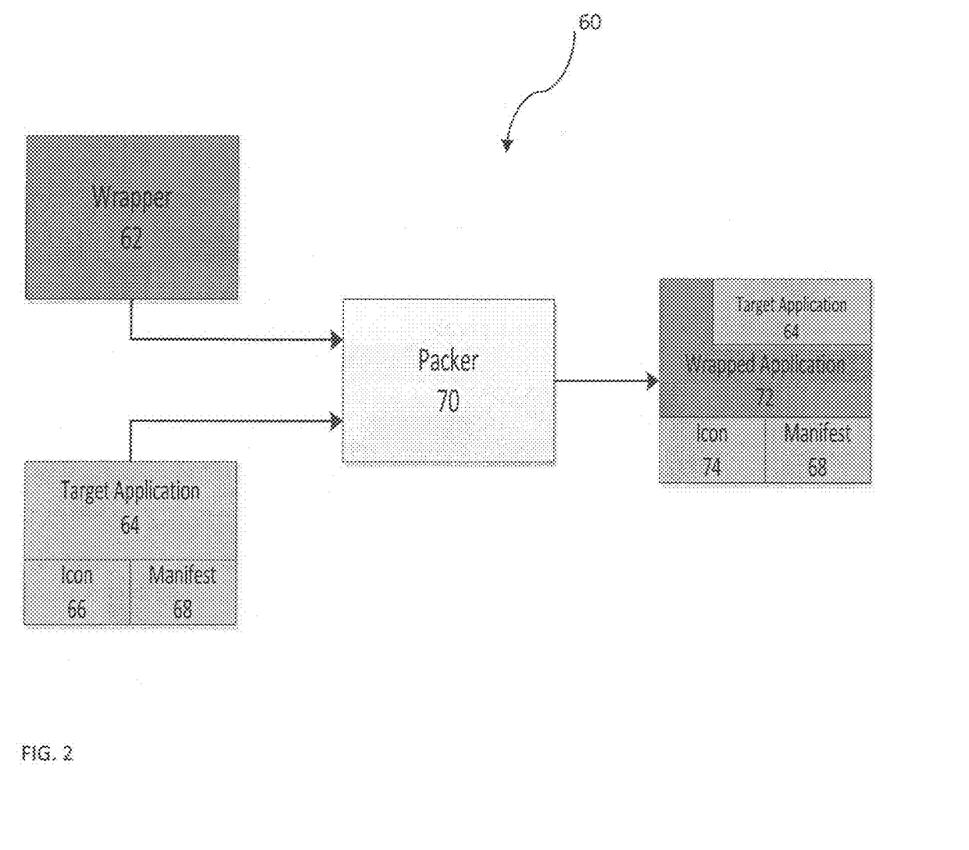
FIG. 2 is a schematic of the packer tool wrapping an application.

Referring to FIG. 2, there is shown the packing process 60 used with the present invention. The packing process 60 includes a wrapper or wrapping function 62, a target application 64 having unknown executable files. The target application 64 includes an icon 66 and a user account control manifest 68. The process includes a packer 70 to pack the target application 64 and wrapper 62 together, creating wrapped application 72 with overlay icon 74.

Packer:

The packer is a tool to generate the wrapped application. It takes the following parameters as input when wrapping an application: 1.) download location to get Sandbox installer if it is not installed—this location can be either a file server or remote HTTP/HTTPS server; 2.) the path of the target application which will be wrapped; and 3.) a wrapper application which performs the main logic of the wrapper.

The process for a packer to wrap an application is as follows and also shown in FIG. 2. First, the packer 70 embeds a target application 64 into the wrapper 62 as a resource with fixed resource identification. Next, the packer extracts the icon 66 of the target application 64, and adds an overlay icon 74 to indicate that it is secured by the sandbox and then applies it to wrapper. Next, the packer extracts the user account control (UAC) manifest 68 of the target application 64 and applies it to the wrapper 62 so that the wrapped application 72 has same UAC behavior with the target application 64. In order to make the packer 70 independent of platforms, resource changes are performed by raw binary modification without using resource API of Windows SDK.

Figure 3:
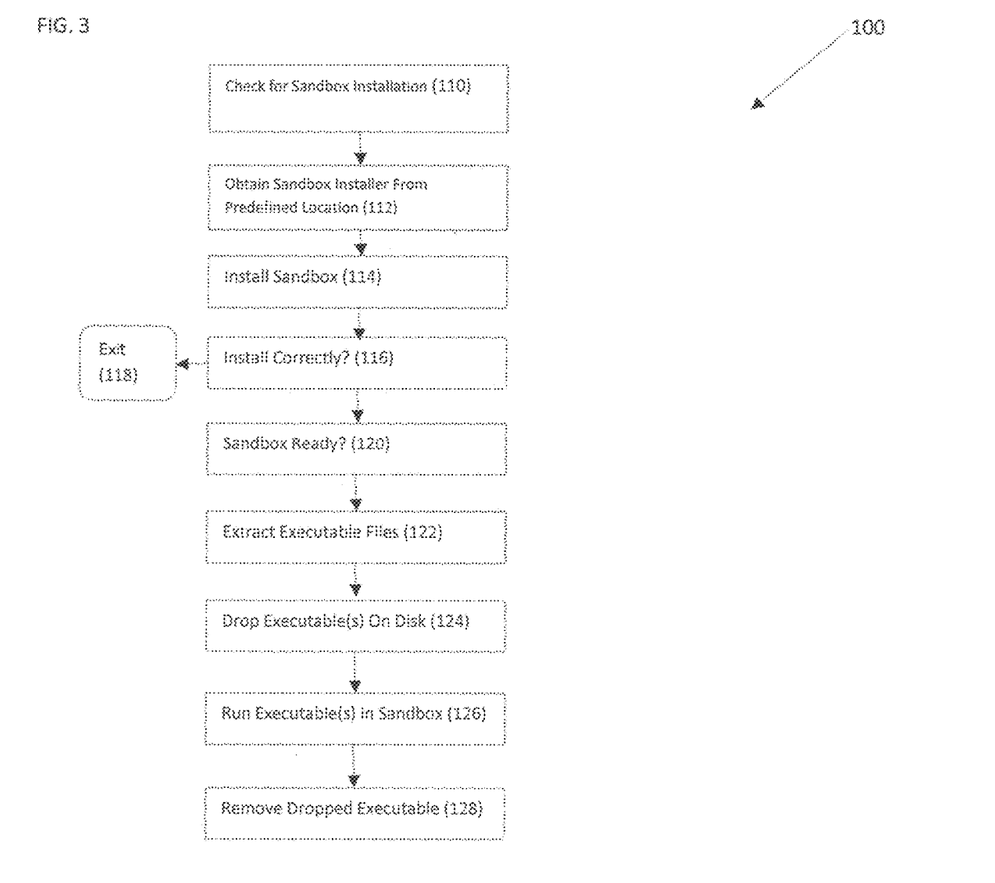
FIG. 3 is a flowchart of the wrapper.

Wrapper:

The wrapper sets up a sandbox environment and runs the target application in the sandbox. As shown in FIG. 3, the wrapper process 100 works in the following manner: First, when the wrapper starts, it checks for a sandbox installation 110. If sandbox is not installed, the wrapper gets the sandbox installer from a predefined location 112 (described above) and installs it with a certain configuration 114. A progress bar is displayed to show the entire progress of downloading and installation. If there is a problem with downloading or installation 116, the wrapper will simply exit 118, thus the application will not run in this case. When the sandbox environment is ready 120, it extracts the executable file(s) from the resource 122, drops it on a disk 124 and run it in the sandbox using a sandbox launcher, e.g. sblauncher.exe [path of dropped app] 126. The wrapper finally removes the dropped executable when it exits 128.

Figure 4A:
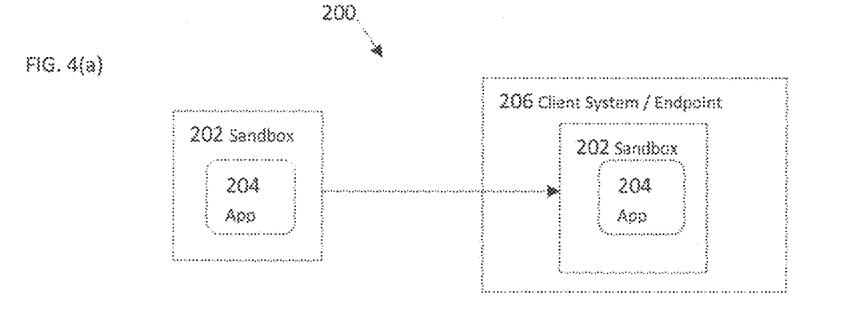
FIGS. 4a-4c are schematics of different wrapping methods of the present invention.
Figure 4B:
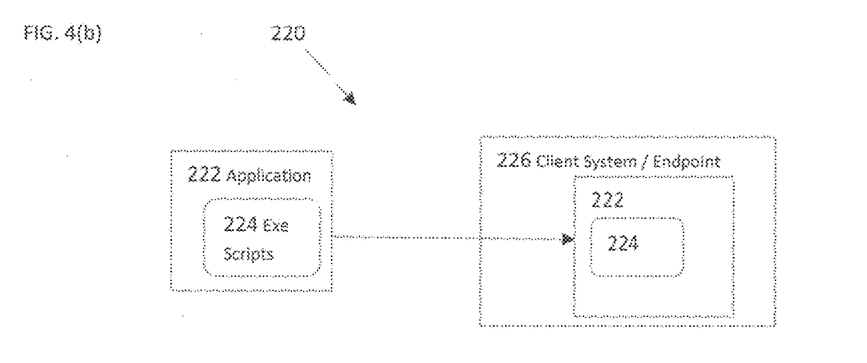
Figure 4C:
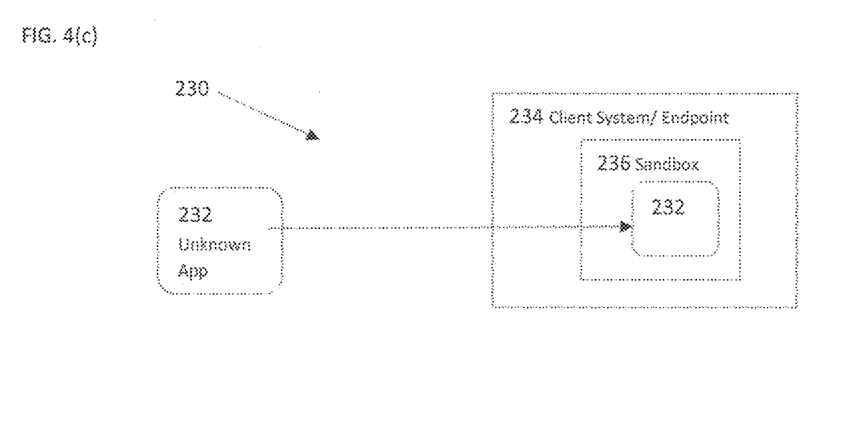

The system and process of wrapping can occur in different methods. First, as described and shown in FIG. 4(*a*), the wrapping 200 is accomplished by placing the application 204 inside the sandbox 202 and delivering the entire package (sandbox 202 and application 204) to the client system/endpoint 206. In FIG. 4(*b*), there is shown a second method of wrapping 220 which includes at least one or more executable script(s) 224 with the unknown application 222, both of which are then delivered to the client system/endpoint 226. In this manner, when the application 222 with the script(s) 224 lands on the endpoint 226, such as the user's computer or handheld device, the executable scripts 224 can be run. In FIG. 4(*c*), a third method of wrapping 230 is disclosed if there is already a sandbox 236 on the endpoint 234. If the end user already has a sandbox application 236 on their device or computer, the present invention can send only the unknown application file 232 to the sandbox 236 in order to conserve data and space while securely delivering the unknown file 232.

Figure 5:
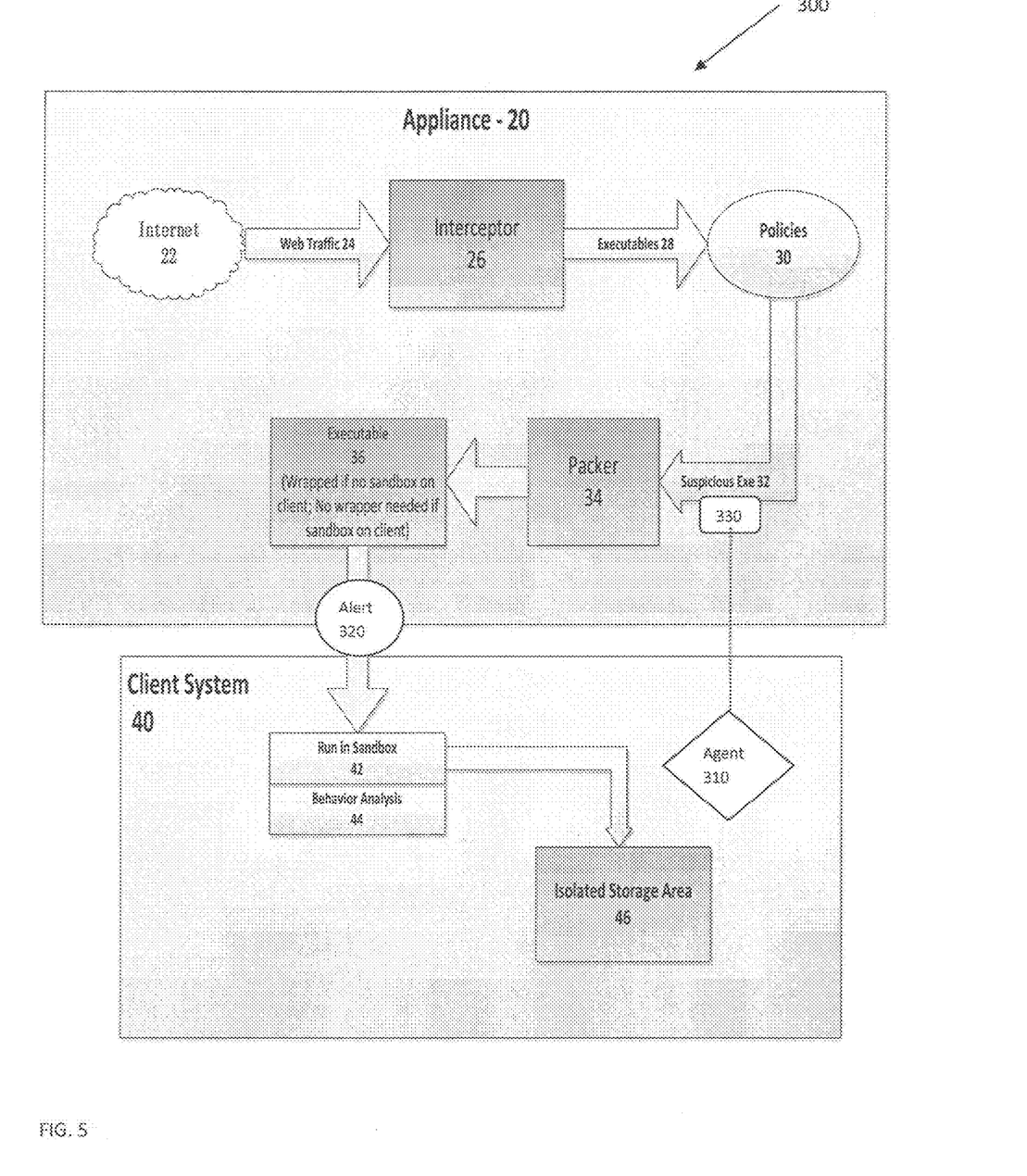
FIG. 5 is an alternate embodiment of the present invention.

With the present invention, an alternative embodiment 300 is shown in FIG. 5 where the appliance identifies an executable file or even a suspicious portion of a file 32 and sends an alert 320 to the client system to run the executable file in a sandbox 42. This is particularly critical for security of the endpoint if an agent or agents 310 are currently running or exist on the client system already and the second file 32 is code which sends instructions 330 to the agent. With the monitor sending the alert 320 to run the file in a sandbox, it prevents the instructions 330 from the second file 32 reaching the malicious agent 310. A wrapper is not necessary if there is a sandbox on a system.

Sandbox:

During the sandboxing process, file system modifications (including creation, deletion, write, and rename) are redirected to an isolated storage area. Similarly, registry modifications (including key/value creation and deletion) are redirected to an isolated storage area. Additionally, all communication between the sandboxed application and the outside application is blocked, for example, process open, DCOM/RPC communication, etc.

Behavior Analysis:

The present invention also performs behaviour analysis while threats are running. For behaviour analysis of the files, all potential suspicious and dangerous behaviours are recorded and analysed. This includes: 1.) process creation and termination; 2.) file system changes; 3.) registry changes; 4.) URL access and DNS query 5.) inter-process communication; and 6.) named objects creation.

Figure 6:
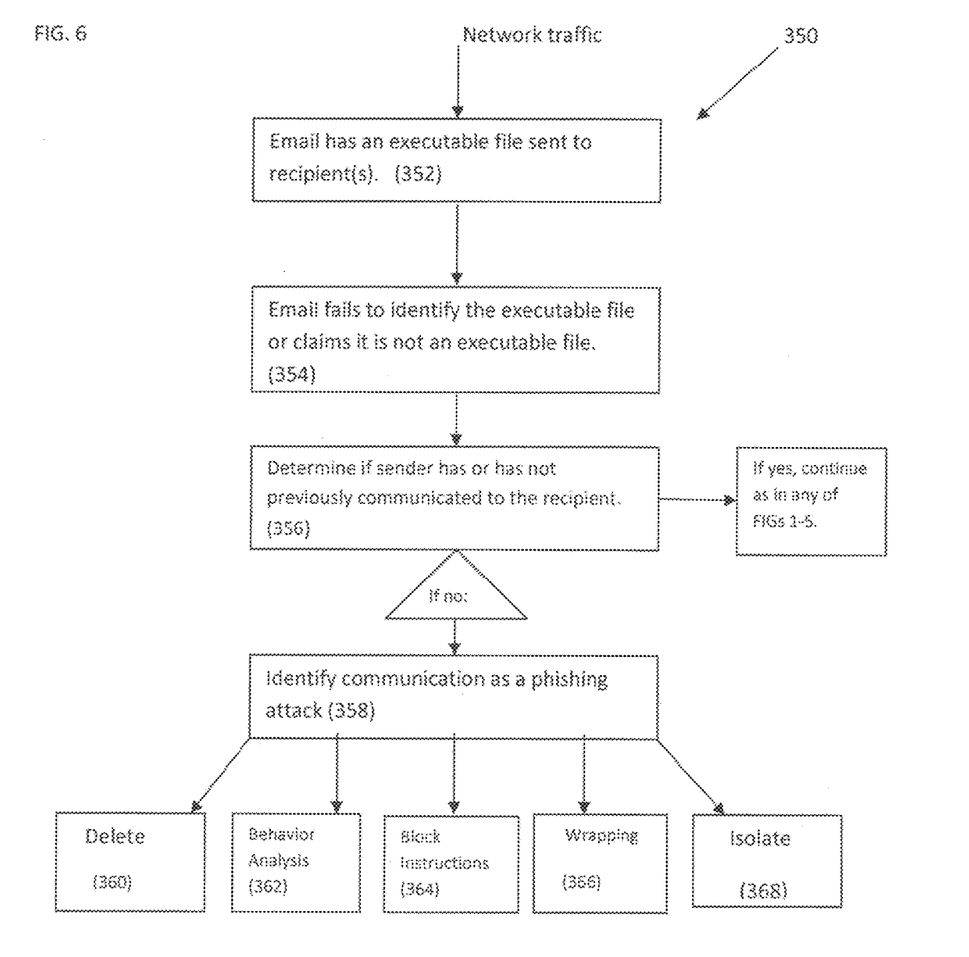
FIG. 6 is a schematic of an anti-phishing embodiment of the present invention.

With reference to FIG. 6, there is shown an embodiment 350 of the present invention which is used to prevent phishing attacks. This may be used in connection with the processes, systems and network appliances described herein. The network traffic is reviewed and monitored as before with FIGS. 1-5 and the traffic includes email or messages. If the email has an executable file which is sent to a recipient or multiple recipients (352), the present invention determines if the email fails to identify the executable file or claims it is not an executable file (354). That is, the executable file and/or the sender's identity or intent are disguised in some manner to deceive the recipient. The present invention determines if the sender of the email has or has not previously communicated with the recipient (356). If the sender has not previously communicated with or sent any other emails to the recipient(s), the present invention identifies the email communication as a phishing attack (358). Once the phishing attack threat is identified, the present invention allows the options as discussed above for FIGS. 1-5 with respect to the executable application, including: deleting the executable(s) (360); further behaviour analysis of the executable application (362); blocking instructions from the executable application to the client or an agent on the client (364); such as shown in FIG. 5; wrapping the executable application (366), including by any of the processes described herein; or isolating the executable application (368). If the sender has previously communicated with the intended recipient, the wrapping processes, systems and appliances of FIGS. 1-5 may likewise be used to protect the network from the disguised executable application.

Figure 7:
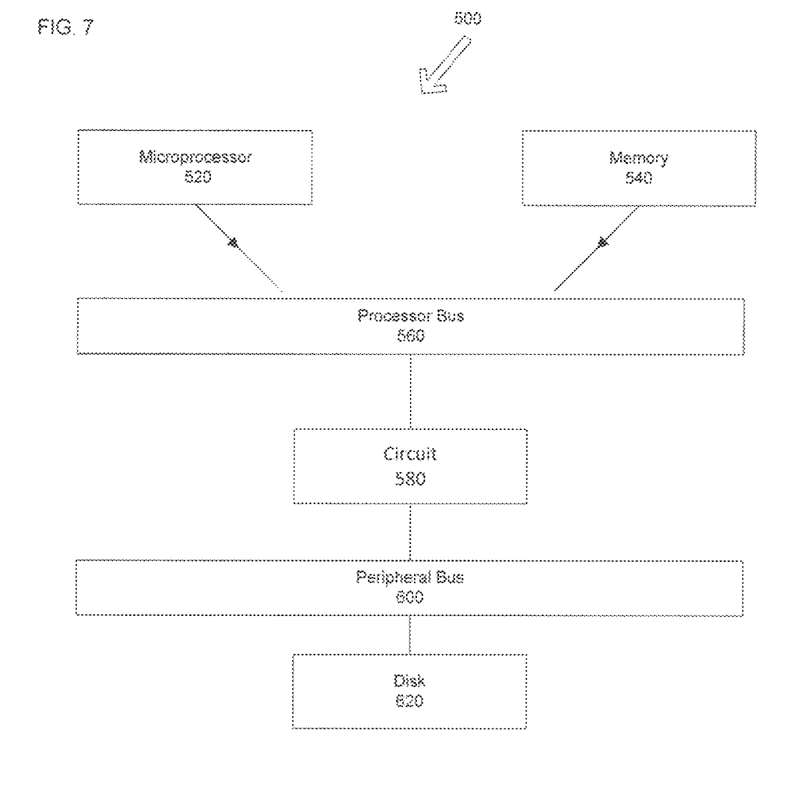
FIG. 7 is a schematic of the memory and hardware of a computer or handheld device, such as a tablet or smartphone.
Figure 8:
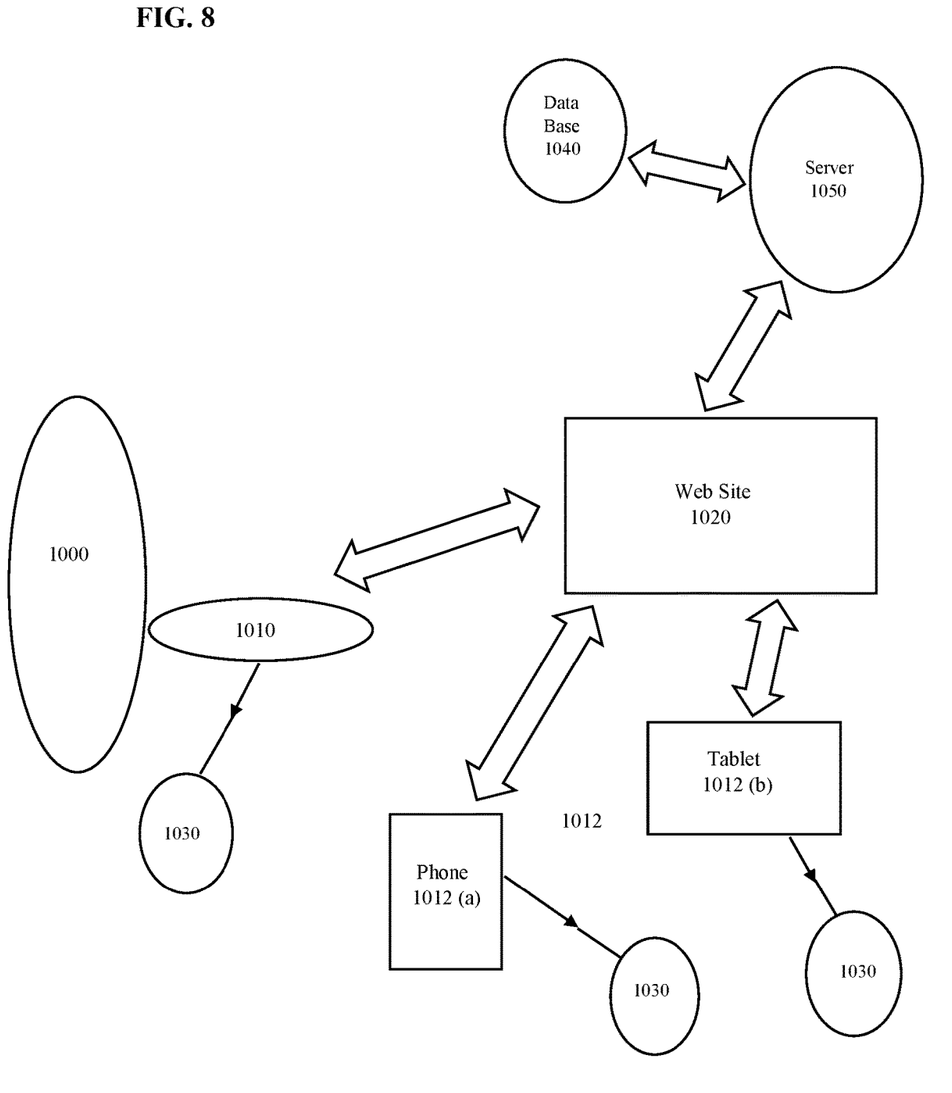
FIG. 8 is a schematic of an individual user operating a computer or handheld device connected to the internet.

The system and method of the present invention may be used with computer systems and devices as shown in FIGS. 7 and 8. FIG. 7 illustrates a system 500 of a computer or device which includes a microprocessor 520 and a memory 540 which are coupled to a processor bus 560 which is coupled to a peripheral bus 600 by circuitry 580. The bus 600 is communicatively coupled to a disk 620. It should be understood that any number of additional peripheral devices are communicatively coupled to the peripheral bus 600 in embodiments of the invention. Further, the processor bus 560, the circuitry 580 and the peripheral bus 600 compose a bus system for computing system 500 in various embodiments of the invention. The microprocessor 520 starts disk access commands to access the disk 620. Commands are passed through the processor bus 560 via the circuitry 580 to the peripheral bus 600 which initiates the disk access commands to the disk 620. In various embodiments of the invention, the present system intercepts the disk access commands which are to be passed to the hard disk.

As shown generally by FIG. 8, there is a user 1000 of a computer 1010 or handheld device 1012 who accesses an Internet website 1020 with network connections to a server 1050 and database 1040. The computer 1010 or handheld device is compatible with operating systems known in the art, such as Windows, iOS or android devices or android type operating systems. The user 1000 is potentially exposed to many malicious or unsafe applications located on the web or a particular website 1020 due to lack of security and validation with the source, even though the website 1020 itself may be known as reliable and trusted. The website may be an application store or directory which includes other software applications for downloading. Similarly, receiving email may introduce unsafe internet links, applications and attachments to the user's computer or device. Those of skill in the art would recognize that the computer 1010 or hand held devices 1012a or 1012b each has a processor and a memory coupled with the processor where the memory is configured to provide the processor with executable instructions. A boot disk 1030 is present for initiating an operating system as well for each of the computer 1010 or hand held devices 1012. It should also be noted that as used herein, the term handheld device includes phones, smart phones, tablets, personal digital assistants, media and game players and the like. It should also be understood that the user's computer or device may be part of an internal network or system which is communicating with the Internet. As used throughout the specifications, the term "query" or "queries" is used in the broadest manner to include requests, polls, calls, summons, queries, and like terms known to those of skill in the art.

Figure 9:
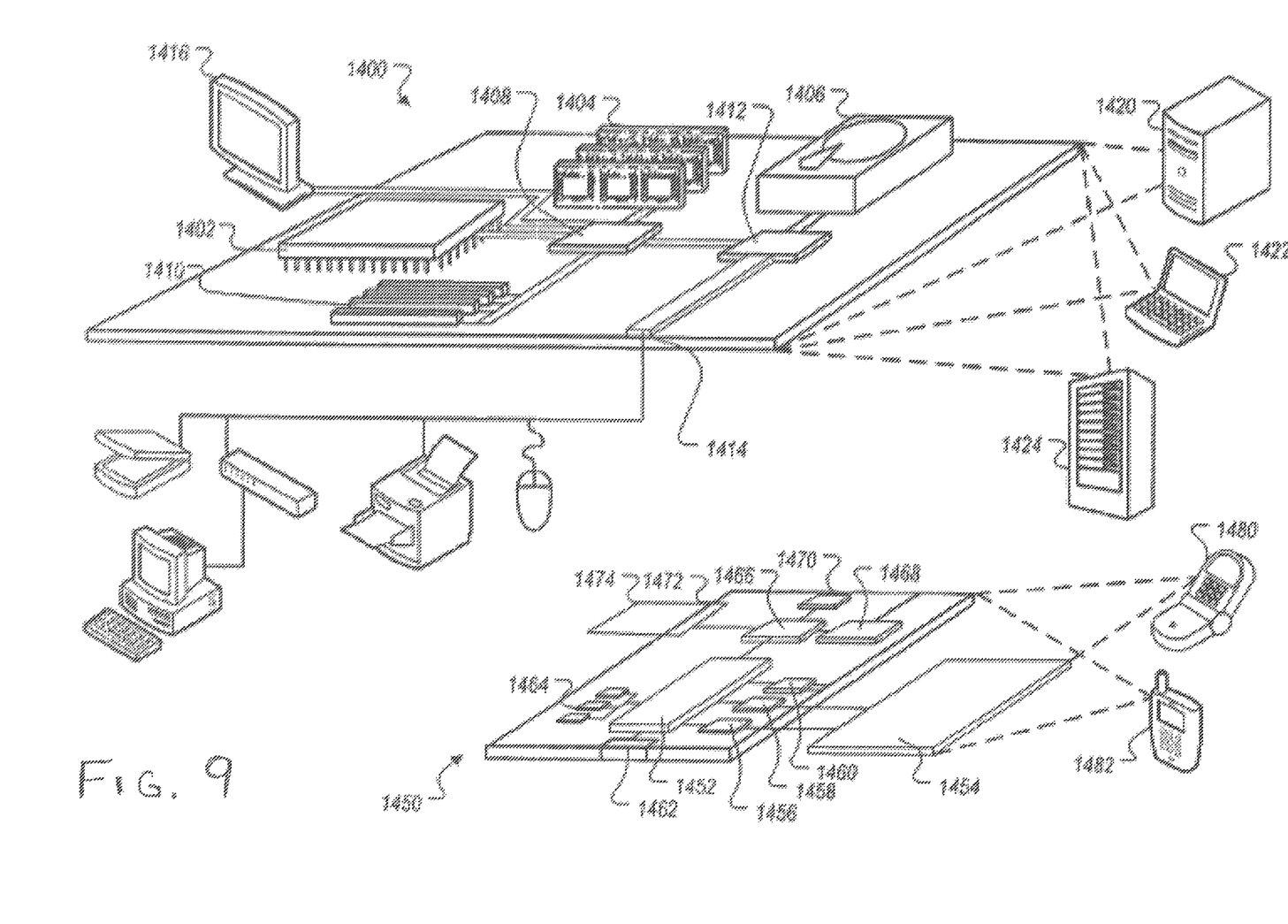
FIG. 9 illustrates computer devices.

FIG. 9 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. A number of implementations have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method to securely deliver executables to an end user comprising:
    monitoring network traffic;
    identifying an unknown executable application based on at least one rule, said at least one rule applied to executable applications to separate said unknown executable application from said executable applications;
    sending an alert to the end user to run the unknown executable application in a sandbox;
    sending the unknown executable application to said sandbox located on a computer of an end user or handheld device of an end user, said sandbox redirecting file system modifications and registry modifications to an isolated storage area on said computer or handheld device;
    performing behavior analysis on the unknown executable application while said unknown executable application is running in said sandbox, said behavior analysis includes process creation and termination, file system changes, registry changes, URL access and DNS query, inter-process communication, and named objects creation;
    preventing the unknown executable application from communicating instructions with a malicious agent existing on the computer of the end user or handheld device of the end user.

2. The method of claim 1 wherein said unknown executable application is from an email with an executable application which said email claims is not an executable application; said email originating from a sender which has not previously communicated with the recipient of said email.

* * * * *